(12) United States Patent
Mifflin et al.

(10) Patent No.: US 9,864,354 B2
(45) Date of Patent: Jan. 9, 2018

(54) HIERARCHICAL MODELING OF PHYSICAL SYSTEMS AND THEIR UNCERTAINTIES

(75) Inventors: Richard T. Mifflin, Houston, TX (US); Michael B. Ray, Milford, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 893 days.

(21) Appl. No.: 13/581,450

(22) PCT Filed: Jan. 13, 2011

(86) PCT No.: PCT/US2011/021141
§ 371 (c)(1),
(2), (4) Date: Aug. 27, 2012

(87) PCT Pub. No.: WO2011/126585
PCT Pub. Date: Oct. 13, 2011

(65) Prior Publication Data
US 2013/0018642 A1    Jan. 17, 2013

Related U.S. Application Data

(60) Provisional application No. 61/321,358, filed on Apr. 6, 2010.

(51) Int. Cl.
| | | |
|---|---|---|
| *G06G 7/48* | (2006.01) | |
| *G05B 17/02* | (2006.01) | |
| *G01V 99/00* | (2009.01) | |
| *G06F 17/50* | (2006.01) | |

(52) U.S. Cl.
CPC ......... *G05B 17/02* (2013.01); *G01V 99/005* (2013.01); *G06F 17/5009* (2013.01); *G06F 2217/16* (2013.01)

(58) Field of Classification Search
CPC .............................. G01V 11/00; G01V 99/005
USPC ......................................... 703/11, 10
See application file for complete search history.

(56) References Cited

U.S. PATENT DOCUMENTS

| | | |
|---|---|---|
| 6,826,520 B1 | 11/2004 | Khan et al. |
| 7,254,091 B1 | 8/2007 | Gunning et al. |
| | (Continued) | |

FOREIGN PATENT DOCUMENTS

| | | |
|---|---|---|
| WO | WO 2001/27858 | 4/2001 |
| WO | WO 2004/046503 | 6/2004 |

OTHER PUBLICATIONS

Beckner, B.L. et al. (2001), "$EM^{power}$: New Reservoir Simulation System", SPE 68116, 2001 SPE Middle East Show, pp. 1-13.
(Continued)

*Primary Examiner* — David Silver
(74) *Attorney, Agent, or Firm* — ExxonMobil Upstream Research Company-Law Department

(57) ABSTRACT

A hierarchical modeling tool or process is provided that represents the fill range of behavior of a hydrocarbon system, accurately including uncertainties and potential events affecting the system. The potential events may include actions taken and information learned. The hierarchical modeling tool may be embedded within a decision support system or used in a stand-alone fashion. Disclosed aspects may link from accurate (high-detail) physics models to an accurate uncertainty representation, and then reduce the accurate uncertainty representation to a high-speed representation of both the physics model and the uncertainty that can be used in an optimizer.

20 Claims, 8 Drawing Sheets

(56) References Cited

U.S. PATENT DOCUMENTS

| | | | |
|---|---|---|---|
| 7,373,251 | B2 | 5/2008 | Hamman et al. |
| 7,716,029 | B2 | 5/2010 | Couet et al. |
| 7,983,883 | B2 | 7/2011 | Chen et al. |
| 8,838,428 | B2 | 9/2014 | Tapscott et al. |
| 2006/0225030 | A1 | 10/2006 | Deffler |
| 2007/0094216 | A1 | 4/2007 | Mathias et al. |
| 2007/0179742 | A1* | 8/2007 | Tabanou et al. ............ 702/181 |
| 2007/0299643 | A1 | 12/2007 | Guyaguler et al. |
| 2008/0133550 | A1 | 6/2008 | Orangi et al. |
| 2009/0276736 | A1* | 11/2009 | Mansfield et al. .............. 716/4 |
| 2009/0288881 | A1 | 11/2009 | Mullins et al. |
| 2010/0082142 | A1 | 4/2010 | Usadi et al. |
| 2010/0217563 | A1* | 8/2010 | Montaron et al. ............... 703/1 |
| 2011/0307230 | A1 | 12/2011 | Lee et al. |
| 2013/0246032 | A1 | 9/2013 | El-Bakry et al. |
| 2014/0287161 | A1 | 9/2014 | Ertas et al. |
| 2016/0253607 | A1 | 9/2016 | Xu |

OTHER PUBLICATIONS

Caers, J. et al. (2008), "A Distance-based Representation of Reservoir Uncertainty: the Metric EnKF", 11$^{th}$ European Conf. on Mathemetics of Oil Recovery, pp. B09.

Christie, M.A. et al. (2008), "Use of Solution Error Models in History Matching", 11$^{th}$ European Conf. on Mathematics of Oil Recovery, pp. B19.

Frykman, P. et al. (2002), "Practical Application of Geostatistical Scaling Laws for Data Integration", *Petrophysics* 43(3), pp. 153-171.

Jenny, P. et al. (2004), "Adaptive Multiscale Finite-Volume Method for Multi-Phase Flow and Transport in Porous Media", *Multiscale Model. Simul.* 3(1) pp. 50-64.

Monfared, H. et al.. "A Critical Analysis of Upscaling, by Comparison with Coarse-Scale Models Generated by History Matching", Institute of Petroleum Engineering, Herlot-Wall University, 3 pgs.

Scheidt, C. et al. (2004), "Assessing Uncertainty and Optimizing Production Schemes—Experimental Designs for Non-Linear Production Response Modeling and Application to Early Water Breakthrough Prevention", 9$^{th}$ European Conf. on Mathematics of Oil Recovery (IFP), pp. A029.

Schulze-Riegert, R. et al. (2007), "Modern Techniques for History Matching", 9$^{th}$ Int'l. Forum on Reservoir Simulation, pp. 1-48.

Stern, D. et al. (1999), "A Technique for Generating Reservoir Simulation Grids to Preserve Geologic Heterogenity", SPE 51942, 1999 SPE Reservoir Simulation Symposium, pp. 1-29.

Zhou, H. et al. (2007), "Operator-Based Multiscale Method for Compressible Flow", *SPE Journal*, pp. 267-273.

\* cited by examiner

Code for Generating, When the First Intermediate Model is Not Sufficiently Calibrated to the Ground-Truth Model. A Second Intermediate Model by Identifying a Second Intermediate Level of Detail Generally Between the Ground-Truth Level of Detail for Each Modeling Dimension and the First Intermediate Level of Detail for Each Modeling Dimension, and Running Second Intermediate Model Instances Through the Second Intermediate Model to Generate Results of the Second Intermediate Model, After Which it is Determined Whether the Second Intermediate Model is Sufficiently Calibrated to the Ground-Truth Model by Comparing the Results of the Second Intermediate Model with the Results of the Ground-Truth Model. —218

Code for Connecting One of the First and Second Intermediate Models to the Sufficiently-Fine Model When One of the First and Second Intermediate Models is Sufficiently Calibrated to the Ground-Truth Model. —220

*FIG. 7B*

HIERARCHICAL MODELING OF PHYSICAL SYSTEMS AND THEIR UNCERTAINTIES

CROSS-REFERENCE TO RELATED APPLICATION

This application is the National Stage of International Application No. PCT/US2011/021141, filed 13 Jan. 2011, which claims the benefit of U.S. Provisional Patent Application No. 61/321,358 filed 6 Apr. 2010 entitled HIERARCHICAL MODELING OF PHYSICAL SYSTEMS AND THEIR UNCERTAINTIES, the entirety of which are incorporated by reference herein.

Disclosed aspects relate to numerical optimization where the free parameters of a numerical model are determined such that the resulting prediction is either minimized or maximized, with application to evaluating, planning and/or managing a physical system.

BACKGROUND OF THE DISCLOSURE

This section is intended to introduce various aspects of the art, which may be associated with aspects of the disclosed techniques and methodologies. A list of references is provided at the end of this section and may be referred to hereinafter. This discussion, including the references, is believed to assist in providing a framework to facilitate a better understanding of particular aspects of the disclosure. Accordingly, this section should be read in this light and not necessarily as admissions of prior art.

Decisions made in petroleum or natural gas reservoir development and management can be important to economic results. Development planning includes decisions regarding size, timing and location of production facilities and potential subsequent expansions and connections. The number, location, path allocation to facilities and timing of wells to be drilled and completed in each field can also be important decisions. Reservoir management decisions include operational strategies such as the injection scheme, the allocation of production rates across wells, working over wells, and drilling new wells. It can also be important to evaluate accurately the economic potential of resources for purposes of acquisition or disposition. These decisions/evaluations are greatly complicated by uncertainties, not only the uncertainties of reservoir properties, but also uncertainties in well and facility behavior, and/or economic conditions. A system for helping to make improved decisions for reservoir development and management should address the uncertainties.

Accurate reservoir development and management decisions depend on accurate predictions of reservoir, well, facility and economic behavior (the "system") in response to those decisions. These predictions rely on estimating the properties impacting the relevant behaviors, and determining the relationship between the properties and the behaviors requires numerical modeling for all but the simplest cases. Improved computer performance increases the amount of detail that can be included in a model, and this increased detail can lead to more accurate predictions of reservoir and fluid behavior, leading to complex, fine-scale (on the order of meters or less) models to represent the key characteristics. On the other hand, the representation of uncertainty drives a need for an ensemble of models to represent the full range of parameter space. At the same time, the optimization of production scenarios may require use of representative, but much-faster-running models, which are necessarily less detailed, given the state of computing technology. Thus there is a simultaneous need for both detailed ("high-fidelity") models and high-speed models. If the high-speed models can be calibrated and linked to the high-fidelity models, the needs for both accuracy and speed might be met. However, generating and calibrating the models may pose a problem. This problem is amplified by the presence of uncertainty because, in that case, the uncertainty representation also has to be calibrated between the high-speed representation with many models and the high-fidelity representation with few models—and propagated between these levels. Therefore, there is a need for a modeling system that is both accurate and fast, so that development planning and reservoir management decisions can be made reliably and quickly. The accuracy is ultimately determined in terms of the relevant expected (weighted averages over all possible uncertain outcomes) flow response of the reservoirs as functions of the conditions and controls applied to them.

In existing methods the model inputs tend to be treated in an ad hoc fashion. Seismic data are used to define the structure of a subsurface region, geologic information is used to construct layers and their properties, and so on. Normally the model is adapted to current needs based on intuition and experience. When different individuals work on different aspects of the physics, different models are built that then need to be combined into a single model. Although there are some software applications that permit integrated modeling of reservoir and facilities (Beckner et al), much work in this area has focused on bringing the physics models together. A more systematic approach to the modeling, including all the relevant physics and uncertainties, is needed.

In complex circumstances it can be difficult to formulate the question being posed in such a way that even a single, deterministic model can be run in a reasonable amount of time. However, engineers with sufficient experience and judgment can usually, with enough effort, eventually find a way to build a good model or to build a model they can adjust/correct to determine a sufficiently accurate result. To explore uncertainty space it may be required to build a large number (hundreds, thousands, or more) of models, but these can be "farmed out" to a large number of central processing units (CPUs) and solved separately.

On the other hand, optimization technologies typically have very poor performance-to-optimization-problem-size (e.g., number of decisions to determine) characteristics— usually with geometric or even exponential growth. And optimization technologies normally require that model results be generated in a large number of cases (hundreds, thousands, or more). So when applying optimization technology even for a single, deterministic case, it may be helpful for the model representing the system to be optimized to run very fast, such as less than one CPU second. In either optimization or uncertainty assessment, accurate but fast models can be helpful to getting the right answer. When trying to assess both optimization and uncertainty, fast models are helpful in all but the most trivial cases. FIG. 1 shows a graphical representation of the trade-off between model detail (measured along horizontal axis 12) and uncertainty detail (measured along vertical axis 14). The angled line 16 represents the limit of computational capability. The position of the angled line depends on the computing system being used. FIG. 1 illustrates that increasing model detail (along horizontal axis 12) limits the range of uncertainty that can be modeled (along vertical axis 14), and that increasing uncertainty detail limits the physical detail that can be modeled explicitly.

To reduce the computational requirements of reservoir flow modeling, upscaling may be used to link coarse (i.e., fast) models with finer-scale models, and in particular, to link reservoir-geology models (static rock and fluid models) to reservoir-flow models. Upscaling consists of determining coarse-scale properties that provide some level of fidelity to fine-scale properties. Even for single-phase flow (permeability upscaling), the upscaling problem is not fully resolved. Simple or even complex averaging techniques suffer from flaws due to the geometric complexity of real rocks. Flow-based approaches may be better to use and are not excessively computationally difficult as long as methods with substantial localization can be used (see Khan and Dawson (2000), Stern and Dawson (1999)). However, for multiphase flow, upscaling methods can be problematic. Classical techniques developed to overcome limitations on computational speed lead to models whose behavior depends strongly on the assumed flows. Furthermore, using measured rock properties to represent model behavior can be flawed on two grounds. First, the region to be modeled or represented usually consists of multiple rock types. Second, fluid flow within the region rarely is uniform within the region. More recent upscaling methods for multiphase flow have been developed to handle this situation (See Jenny et al., Zhou et al. (1997)). These methods basically involve embedding a fine scale solution in the coarse scale. The fine scale model is retained in its original form or in another form and used to compute local flow behavior. However, these methods tend to be expensive in terms of computing time and still do not adequately solve how the properties of the coarse scale are determined.

Systematic errors in model behavior at coarser scales have not been widely recognized. Some initial work has been done by Christie et al (2008), but its comparison of tank models to very coarse models may be insufficient for many applications. Determining systematic error across all scales may be needed for proper validation and calibration of a model.

The methods described above implicitly or explicitly assume that the fine-scale model is deterministic. For the levels of uncertainty commonly found in reservoir models, including uncertainty in the system to be modeled may complicate the ability to arrive at an accurate model. The most commonly used approach is to create a small number (often just one or two) of additional models that are thought to represent key uncertainties in the system and to work the reservoir engineering or development planning problem for each of these cases.

Recent efforts have been made to be more thorough in representing uncertainty, for example by developing a series of single-property distribution diagrams or two-property cross-correlation diagrams. However, the actual geology, geophysics, and geochemistry found in reality is necessarily more complex.

Unless data are lost, uncertainty resolves over time. Thus, true uncertainty should be monotonically decreasing. However, the perceived uncertainty may suffer increases as unexpected information about the reservoir is learned. The foregoing refers to "total" (field-wide) uncertainty. Local uncertainty (in a particular region of space) can remain large for bypassed regions late into the life of a reservoir. If neighboring regions are developed and thus the properties of those regions become well-known, the uncertainty in adjacent bypassed regions will be a strong function of the quality of the structure (normally estimated through seismic data) and the extent to which properties in the neighboring region can be correlated into the bypassed region.

Previous attempts to model complex development planning or reservoir management systems focus on linking (but not fully integrating) reservoir and facility models. Such efforts are largely unnecessary when a fundamentally integrated approach is used, as described in Beckner et al. (2001). Use of a linked (not integrated) modeling approach would make Hierarchical Modeling difficult, but not impossible, to apply.

The following references may be relevant.

U.S. Pat. No. 7,373,251 B2 to Hamman, et al.
U.S. Pat. No. 7,254,091 B1 to Gunning, et al.
U.S. Pat. No. 6,826,520 to Khan, et al.
U.S. Patent Application No. US2008/0133550 A1 to Orangi, et al.
U.S. Patent Application No. US2007/0299643 A1 to Guyaguler, et al.
U.S. Patent Application No. US2007/0265815 to Couet, et al.
Patent Publication WO2004046503 A1 to Kosmala, et al.
Patent Publication WO2001027858 A1 to Anderson, et al.
Schulze-Riegert, R., Ghedan, S., "Modern Techniques for History Matching"; 9th International Symposium on Reservoir Simulation, Abu Dhabi (2007)
Frykman, P., and Deutsch, C. V., "Practical Application of Geostatistical Scaling Laws for Data Integration", Petrophysics 43(3), May-June 2002, pp 153-171 (2002).
Monfared, H., Christie, M., Pickup, G., "A Critical Analysis of Upscaling", 13th Congress of the Research Inst. of Petroleum Industry (National Iranian Oil Co.) (2007)
Jenny, P., Lee, S. H., and Tchelepi, H. A., "Adaptive Multiscale Finite-Volume Method for Multi-Phase Flow and Transport in Porous Media", Multiscale Model. Simul. 3(1) pp 50-64 (2004).
Zhou, H., and Tchelepi, H. A., "Operator Based Multiscale Method for Compressible Flow", SPE106254 presented at the 2007 SPE Reservoir Simulation Symposium, Feb. 26-28, 2007, Houston, Tex.
Beckner, B. L., Hutfilz, J. M., Ray, M. B., Tomich, J. F., "EMpower: ExxonMobil's New Reservoir Simulation System", 2001 SPE Middle East Oil Show Bahrain, March 2001.
Stern, D., Dawson, A. G., "A Technique for Generating Reservoir Simulation Grids Preserving Geologic Heterogeneity", 1999 SPE Reservoir Simulation Symposium, Houston, Tex.
Christie, M. A., Pickup, G. E., O'Sullivan, A. E., Demanyov V., "Use of Solution Error Models in History Matching", 11th European Conference on Mathematics of Oil Recovery, Bergen, Norway, Sep. 8-11, 2008.
Scheidt, C., Zabalza-Mezghani, I., "Assessing Uncertainty and Optimizing Production Schemes—Experimental Designs for Non-Linear Production Response Modeling and Application to Early Water Breakthrough Prevention" 9th European Conference on Mathematics of Oil Recovery, (IFP) Cannes, France, Aug. 30-Sep. 2, 2004.
Caers, J., Park, K., "A Distance-based Representation of Reservoir Uncertainty: the Metric EnKF", 11th European Conference on Mathematics of Oil Recovery, Bergen, Norway, Sep. 8-11, 2008.

SUMMARY

In one aspect, a method of creating a hierarchy of models of a hydrocarbon management system is provided. Modeling dimensions are identified in which known parameters and uncertainties relevant to the hydrocarbon management system are represented. A ground-truth model is generated by estimating a ground-truth level of detail for each modeling dimension. A sufficiently-fine model is generated by estimating a sufficiently-fine level of detail for each modeling dimension. A parameter space is estimated that expresses outcomes of model instances in the sufficiently-fine model. Using a computer, ground-truth model instances are run to generate results of the ground-truth model. The ground-truth model instances are selected to represent desired regions of the parameter space. A first intermediate model is generated by identifying a first intermediate level of detail for each modeling dimension generally between the ground-truth level of detail and the sufficiently fine level of detail. Using a computer, first intermediate model instances are run to generate results of the first intermediate model. The first intermediate model instances are selected to represent desired regions of the parameter space. It is determined whether the first intermediate model is sufficiently calibrated to the ground-truth model by comparing the results of the first intermediate model with the results of the ground-truth model. When the first intermediate model is not sufficiently calibrated to the ground-truth model, a second intermediate model is generated by identifying a second intermediate level of detail generally between the ground-truth level of detail for each modeling dimension and the first intermediate level of detail for each modeling dimension, and second intermediate model instances are run to generate results of the second intermediate model, after which it is determined whether the second intermediate model is sufficiently calibrated to the ground-truth model by comparing the results of the second intermediate model with the results of the ground-truth model. When one of the first and second intermediate models is sufficiently calibrated to the ground-truth model, the first or second intermediate models are connected to the sufficiently-fine model. Model instances of the sufficiently-fine model, the first intermediate model, and/or the second intermediate model are outputted.

According to disclosed methodologies and techniques, all known parameters and uncertainties may be represented in the modeling dimensions. The uncertainties relevant to the purpose of the model may be represented in a single modeling dimension. The uncertainties relevant to the purpose of the model may be represented in more than one modeling dimension. Model surrogates may be generated using the outputted model instances, where the model surrogates approximate the hydrocarbon management system. The model surrogates may be one or more equations or formulas that approximate the hydrocarbon management system. The generated model surrogates may be inputted into an optimization routine, and the results of the optimizer may be outputted. The ground-truth level of detail associated with one of the modeling dimensions may be different from the ground-truth level of detail associated with another modeling dimension. The ground-truth level of detail may be defined as the coarsest level of detail that can fully model the hydrocarbon management system such that further refinement of that coarsest level of detail does not substantially affect predicted behavior of the hydrocarbon management system. The known parameters represented by the modeling dimensions may include geologic detail, fluid representation, production representation, economic modeling, and/or political considerations. The results of the first intermediate model and the results of the ground-truth model may be properties or other quantities such as compartmentalization, connectedness, channelization, well drainage volumes, well productivity indices, well critical rates, intercompartmental productivity indices, aquifer indices, and stability numbers for gas and water drive. The hydrocarbon management system may be one or more hydrocarbon reservoirs and/or hydrocarbon extraction equipment. Supplemental first intermediate model instances may be generated and run when it is determined that the first intermediate model instances do not substantially represent all desired regions of the parameter space, and thereby generating supplemental results of the first intermediate model that are included with the results of the first intermediate model.

According to other disclosed methodologies and techniques, the following may be repeatedly performed until one of the generated intermediate models is sufficiently calibrated to the ground-truth model: an additional intermediate model is generated by identifying an additional intermediate level of detail between two of the previously generated levels of detail for each modeling dimension. Model instances associated with the additional intermediate model are run to generate results of the additional intermediate model. It is determined whether the additional intermediate model is sufficiently calibrated to the ground-truth model by comparing the results of the additional intermediate model with the results of the ground-truth model.

According to still other methodologies and techniques, connecting one of the first and second intermediate models to the sufficiently-fine model includes the following steps: (a) identifying the intermediate model having the coarsest level of detail and that is sufficiently calibrated, directly or indirectly, to the ground-truth model; (b) if none of the remaining generated models can be sufficiently calibrated to the intermediate model sufficiently calibrated to the ground-truth model, generating a first additional intermediate model having a level of detail generally more coarse than the intermediate model sufficiently calibrated to the ground-truth model; (c) when the first additional intermediate model can not be sufficiently calibrated to the intermediate model sufficiently calibrated to the ground-truth model, generating a second intermediate model having a level of detail generally more fine than the first additional intermediate model and that is sufficiently calibrated to the first additional intermediate model; (d) when the additional intermediate model can be sufficiently calibrated to the intermediate model sufficiently calibrated to the ground-truth model, repeating steps (a), (b), and (c) to generate more additional intermediate models until the ground-truth model is sufficiently calibrated to the sufficiently-fine model through one or more intermediate models.

In another aspect, a computer program product is provided having computer executable logic recorded on a tangible, machine-readable medium. The computer program product includes: (a) code for identifying modeling dimensions in which known parameters and uncertainties relevant to a hydrocarbon management system are represented; (b) code for generating a ground-truth model by estimating a ground-truth level of detail for each modeling dimension; (c) code for generating a sufficiently-fine model by estimating a sufficiently-fine level of detail for each modeling dimension; (d) code for estimating a parameter space that expresses outcomes of model instances in the sufficiently-fine model; (e) code for running ground-truth model instances to generate results of the ground-truth model, the ground-truth model instances being selected to represent desired regions of the parameter space; (f) code for generating a first intermediate model by identifying a first intermediate level of detail for each modeling dimension generally between the ground-truth level of detail and the sufficiently fine level of detail; (g) code for running first intermediate model instances to generate results of the first intermediate model, the first intermediate model instances being selected to represent desired regions of the parameter space; (h) code for determining whether the first intermediate model is sufficiently calibrated to the ground-truth model by comparing the results of the first intermediate model with the results of the ground-truth model; (i) code for generating, when the first intermediate model is not sufficiently calibrated to the ground-truth model, a second intermediate model by identifying a second intermediate level of detail generally between the ground-truth level of detail for each modeling dimension and the first intermediate level of detail for each modeling dimension, running second intermediate model instances to generate results of the second intermediate model, determining whether the second intermediate model is sufficiently calibrated to the ground-truth model by comparing the results of the second intermediate model with the results of the ground-truth model; and (j) code for connecting one of the first and second intermediate models to the sufficiently-fine model when one of the first and second intermediate models is sufficiently calibrated to the ground-truth model.

According to still other disclosed methodologies and techniques, code may be provided for outputting one or more model instances of the sufficiently-fine model, the first intermediate model instances, and the second intermediate model instances. Code may be provided for generating model surrogates using the outputted model instances, the model surrogates being one or more equations or formulas that approximate the hydrocarbon management system. Code may be provided for optimizing the generated model surrogates.

In another aspect, a method is provided for extracting hydrocarbons from a subsurface region. Modeling dimensions are identified in which known parameters and uncertainties relevant to the hydrocarbon management system are represented. A ground-truth model is generated by estimating a ground-truth level of detail for each modeling dimension. A sufficiently-fine model is generated by estimating a sufficiently-fine level of detail for each modeling dimension. A parameter space that expresses outcomes of model instances in the sufficiently-fine model is estimated. Ground-truth model instances are run to generate results of the ground-truth model. The ground-truth model instances are selected to represent desired regions of the parameter space. A first intermediate model is generated by identifying a first intermediate level of detail for each modeling dimension generally between the ground-truth level of detail and the sufficiently fine level of detail. First intermediate model instances are run to generate results of the first intermediate model. The first intermediate model instances are selected to represent desired regions of the parameter space. It is determined whether the first intermediate model is sufficiently calibrated to the ground-truth model by comparing the results of the first intermediate model with the results of the ground-truth model. When the first intermediate model is not sufficiently calibrated to the ground-truth model, generating a second intermediate model by identifying a second intermediate level of detail generally between the ground-truth level of detail for each modeling dimension and the first intermediate level of detail for each modeling dimension, and second intermediate model instances are run to generate results of the second intermediate model, after which it is determined whether the second intermediate model is sufficiently calibrated to the ground-truth model by comparing the results of the second intermediate model with the results of the ground-truth model. When one of the first and second intermediate models is sufficiently calibrated to the ground-truth model, the first or second intermediate models is connected to the sufficiently-fine model. Model instances of the sufficiently-fine model, the first intermediate model, and/or the second intermediate model instances are outputted and used to predict a presence and/or a location of hydrocarbons in the subsurface region. Hydrocarbons are extracted from the subsurface region.

BRIEF DESCRIPTION OF THE DRAWINGS

The foregoing and other advantages may become apparent upon reviewing the following detailed description and drawings of non-limiting examples of embodiments in which:

FIGS. 7A and 7B comprise a flowchart depicting machine-readable code;

Figure 1:
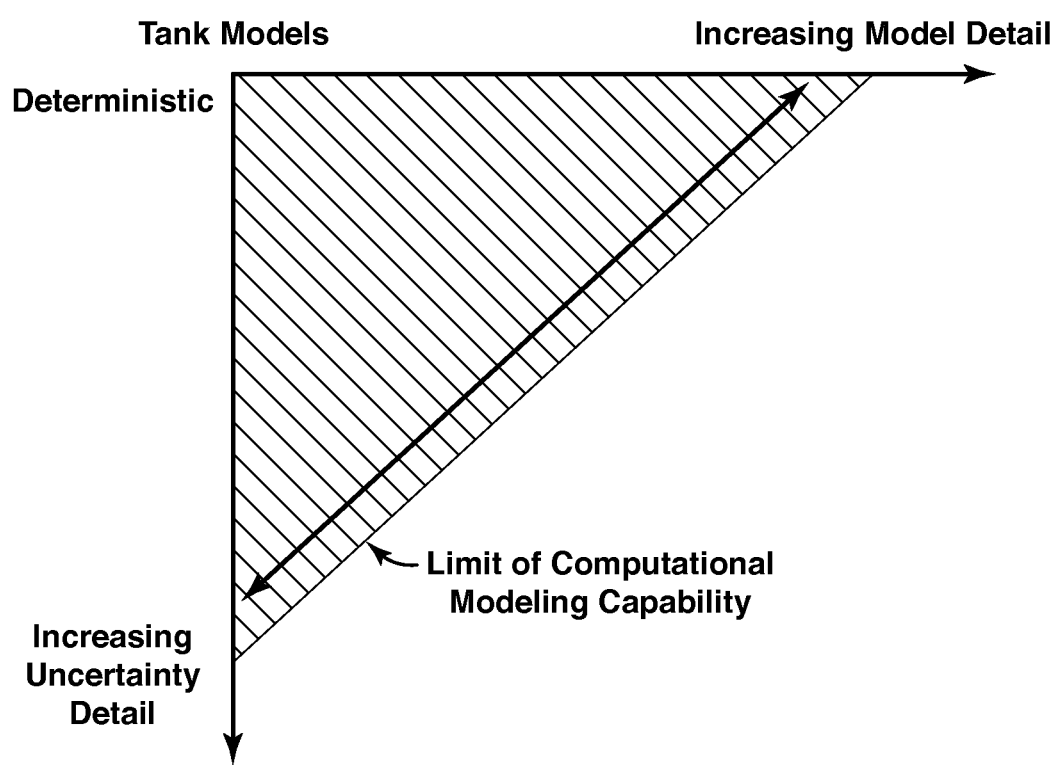
FIG. 1 is a graph showing the interplay of model detail and model uncertainty.

To the extent the following detailed description is specific to a particular embodiment or a particular use of the disclosed techniques, this is intended to be illustrative only and not to be construed as limiting the scope of the invention. On the contrary, it is intended to cover all alternatives, modifications and equivalents that may be included within the spirit and scope of the invention, as defined by the appended claims.

DETAILED DESCRIPTION

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "creating". "identifying", "representing", "generating", "estimating", "expressing", "running", "selecting", "determining", "comparing", "connecting", "outputting", "inputting", "predicting", "repeating", "calibrating", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium.

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "hydrocarbon reservoirs" include reservoirs containing any hydrocarbon substance, including for example one or more than one of any of the following: oil (often referred to as petroleum), natural gas, gas condensate, tar and bitumen. The term "hydrocarbon reservoirs" also includes reservoirs used for the storage of $CO_2$, for example to enhance the production of hydrocarbons or to sequester $CO_2$.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" may also be used for the injection or storage of hydrocarbons or $CO_2$, for example the sequestration of $CO_2$. Further, the term "hydrocarbon management" may include development planning activities and decisions as discussed herein.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

As used herein, the terms "optimal," "optimizing," "optimize," "optimality," "optimization" (as well as derivatives and other forms of those terms and linguistically related words or phrases), are not intended to be limiting in the sense of requiring a method or system to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, it is to be understood that these terms are more general. The terms can describe working toward a solution which may be the best available solution, a preferred solution, or a solution that offers a specific benefit within a range of constraints; or continually improving; or refining; or searching for a high point or maximum (or a low point or a minimum) for an objective; or processing to reduce a penalty function or cost function; etc.

As used herein, "physics" denotes all modeling factors other than uncertainty—including but not limited to geology, fluid flow, economics, marketing and other business or political factors.

As used herein, "rock" includes various geological materials that may be encountered during drilling operations, e.g., salt, clay, shale, sand and the like, in addition to those materials more formally classified as "rocks."

As used herein, "subsurface" means beneath the top surface of any mass of land at any elevation or over a range of elevations, whether above, below or at sea level, and/or beneath the floor surface of any mass of water, whether above, below or at sea level.

As used herein, a "model" is an approximation of a system that can be expressed in mathematical terms. The model may require multiple dimensions to express adequately the behavior of the system.

As used herein, a "model instance" is an expression of an approximation of a system at specified parameter values. For a model describing a system in terms of permeability and porosity, a model instance is created or generated by solving the model using a specific value for each of permeability and porosity. Additional model instances may be created or generating by solving the model using different specific values for permeability and porosity.

As used herein, "dimension" is a category or aspect of a question or problem to be solved by a model hierarchy. Preferably each dimension is substantially or entirely independent of every other dimension in a model hierarchy, or in other words, the variables, statements and/or equations associated with a dimension are substantially or entirely unaffected by changes to the variables, statements and/or equations associated with other dimensions. Examples of dimensions in a hydrocarbon system may include geologic detail, fluid representation, production representation, economic considerations, geopolitical considerations, and uncertainty. A dimension may have multiple models that can be used to describe its aspects. Each model may have a different level of detail associated therewith.

As used herein, "modeling space" is the region in one or more dimensions of the model hierarchy between the ground-truth level of detail and the sufficiently-fine level of detail.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

The uncertainty in system behavior can be reduced via modeling. The underlying uncertainty can be reduced by obtaining more accurate data, but modeling can bring the data to bear so that a better estimate of the true (smallest) uncertainty can be determined. In one aspect, uncertainty is treated as another modeling factor that should be as accurately represented as possible. In other words, the uncertainty in the model should match the uncertainty in the data. The uncertainty should be modeled as being as small as it actually is, but no smaller.

According to disclosed aspects and methodologies, a hierarchical modeling tool or process is provided that represents the full range of behavior of a hydrocarbon system, accurately including uncertainties and potential events affecting the system. The potential events may include actions taken and information learned. The hierarchical modeling tool may be embedded within a decision support system or used in a stand-alone fashion. Disclosed aspects may link from accurate (high-detail) physics models to an accurate uncertainty representation, and then reduce the accurate uncertainty representation to a high-speed representation of both the physics model and the uncertainty that can be used in an optimizer.

Figure 2:
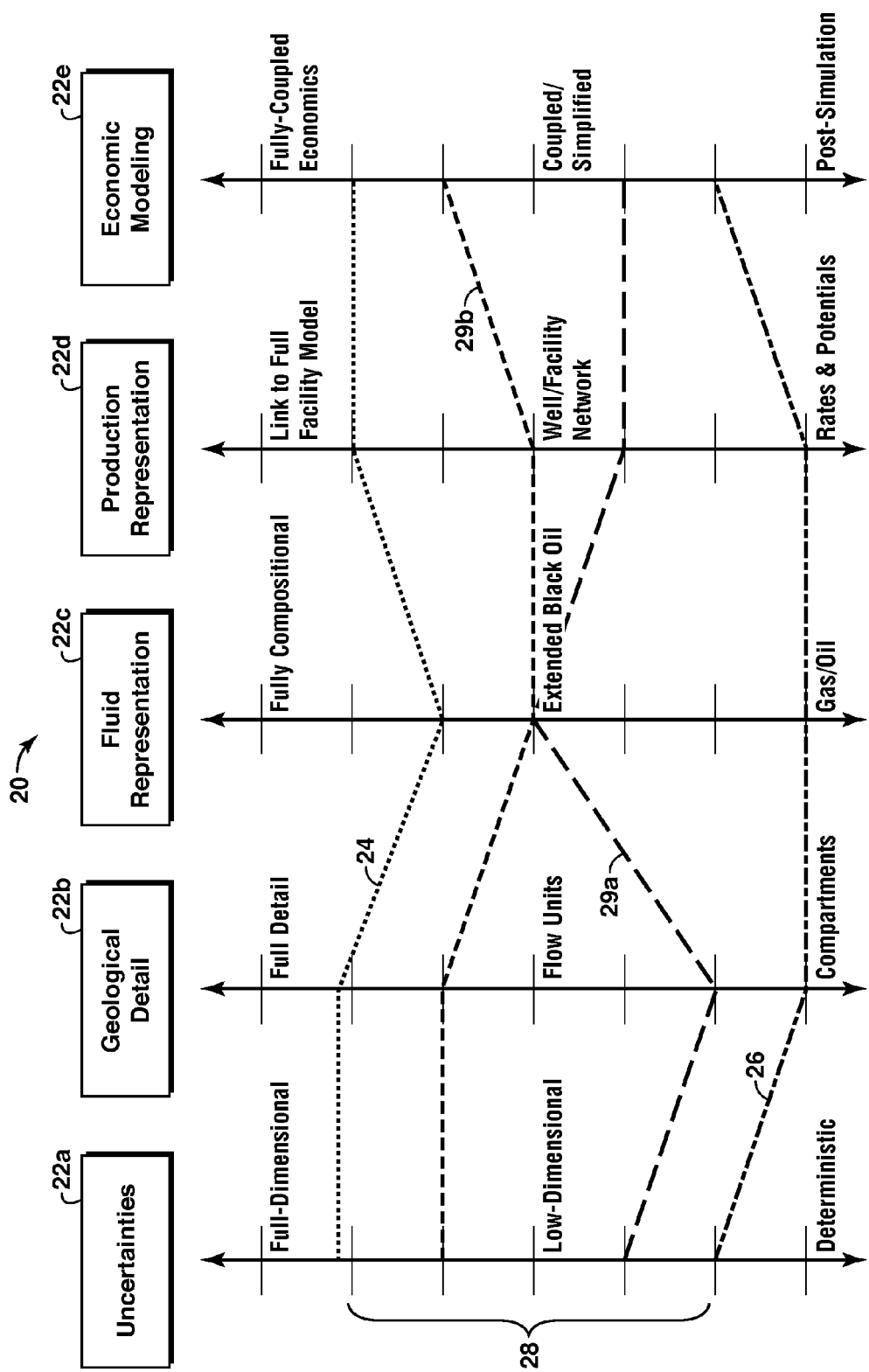
FIG. 2 is a schematic diagram of a model hierarchy.

FIG. 2 shows a schematic depiction of a model hierarchy 20. The model hierarchy includes a plurality of dimensions 22a-22e that together mathematically describe substantially all that is known about the system to be modeled. In FIG. 2, for example, the physics dimensions for a geophysical system are shown as geologic detail 22b, fluid representation 22c, production representation 22d, and economic modeling 22e. Also included is a dimension 22a for uncertainties. Each dimension has a level of detail that varies from very fine to very coarse. For example, a very fine level of detail for the fluid representation dimension 22c may express or describe a fully compositional model, while a very coarse level of detail may express or describe a simple or binary gas/oil differentiation.

Another aspect of the model hierarchy is a ground-truth level of detail 24 for each dimension. The ground-truth level of detail is the coarsest level of detail that can fully model the system, as would be needed in a direct ("brute force") assessment of the decision at hand. Further detail/refinement from the ground-truth level of detail does not materially affect the predicted behavior of the system. Ground-truth level of detail 24 is represented as a dashed line in FIG. 2. As can be seen, the ground-truth level of detail may be different for each dimension and may vary depending on the amount and quality of input data, how sensitive the model is to changes in level of detail of a dimension, and in the importance of the dimension to the outcome of the model. A user typically selects a ground-truth level of detail for each dimension based on these and other factors, usually taking into account the increased computational time and expense of an overly fine level of detail. In general the ground-truth level of detail can vary spatially and in time over the model, and over the range of operational/response behaviors relevant to the decision at hand. However, significant simplification can be achieved if a single ground-truth level of detail is identified across the entire model for the entire time of simulation for all relevant operational actions. The ground-truth level of detail is also not entirely independent of the parameter space (as described below). It is in fact likely for cases with high levels of uncertainty that different regions of parameter space will have somewhat different ground-truth levels of detail. Consideration may need to be made for such cases, as described further herein. The uncertainty dimension 22a is shown as having a single ground-truth level of detail. However, when the ground-truth level of detail for uncertainty varies widely over the uncertainty parameters, it may be advantageous to divide uncertainty space into multiple uncertainty dimensions in which each dimension has an approximately uniform ground truth level of detail. This will make it easier to build, calibrate, and interpret the models.

Still another aspect of the model hierarchy is a sufficiently-fine level of detail for each dimension. A sufficiently-fine level of detail 26, shown in FIG. 2 as a dashed line, is a level of detail having the maximum amount of coarseness in a model category that retains sufficient detail to achieve a correct answer. The sufficiently-fine level of detail may vary in space and time and as a function of the parameter space. A user selects the sufficiently-fine level of detail for each dimension using factors similar to those used when selecting a ground-truth level of detail.

The area 28 between the ground-truth level of detail and the sufficiently-fine level of detail, termed the modeling space, is the area in which the model hierarchy operates or is generated. Specifically, the model hierarchy represents both the physics and the uncertainty accurately by developing a hierarchy of models linking the sufficiently-fine level of detail (high-speed) and the ground-truth level of detail (high-fidelity) across each relevant dimension such that the sets of models at different levels of detail are mutually consistent. Each dimension may have multiple levels of detail because in at least some dimensions jumping all the way from the most detailed model to the coarsest model may result in a loss in accuracy that may not be corrected through calibration. Consistency across levels of detail should be enforced not only for the more typical physical and economic dimensions, but also for the uncertainty dimension or dimensions. The model at each level of detail considers the region of parameter space represented by each model. On the other hand, modeling in the hierarchy can be flexibly adapted to the particular business need being addressed, with varying degrees of complexity in each dimension. Such model hierarchies can greatly improve optimization, uncertainty and sensitivity analysis.

Figure 3:
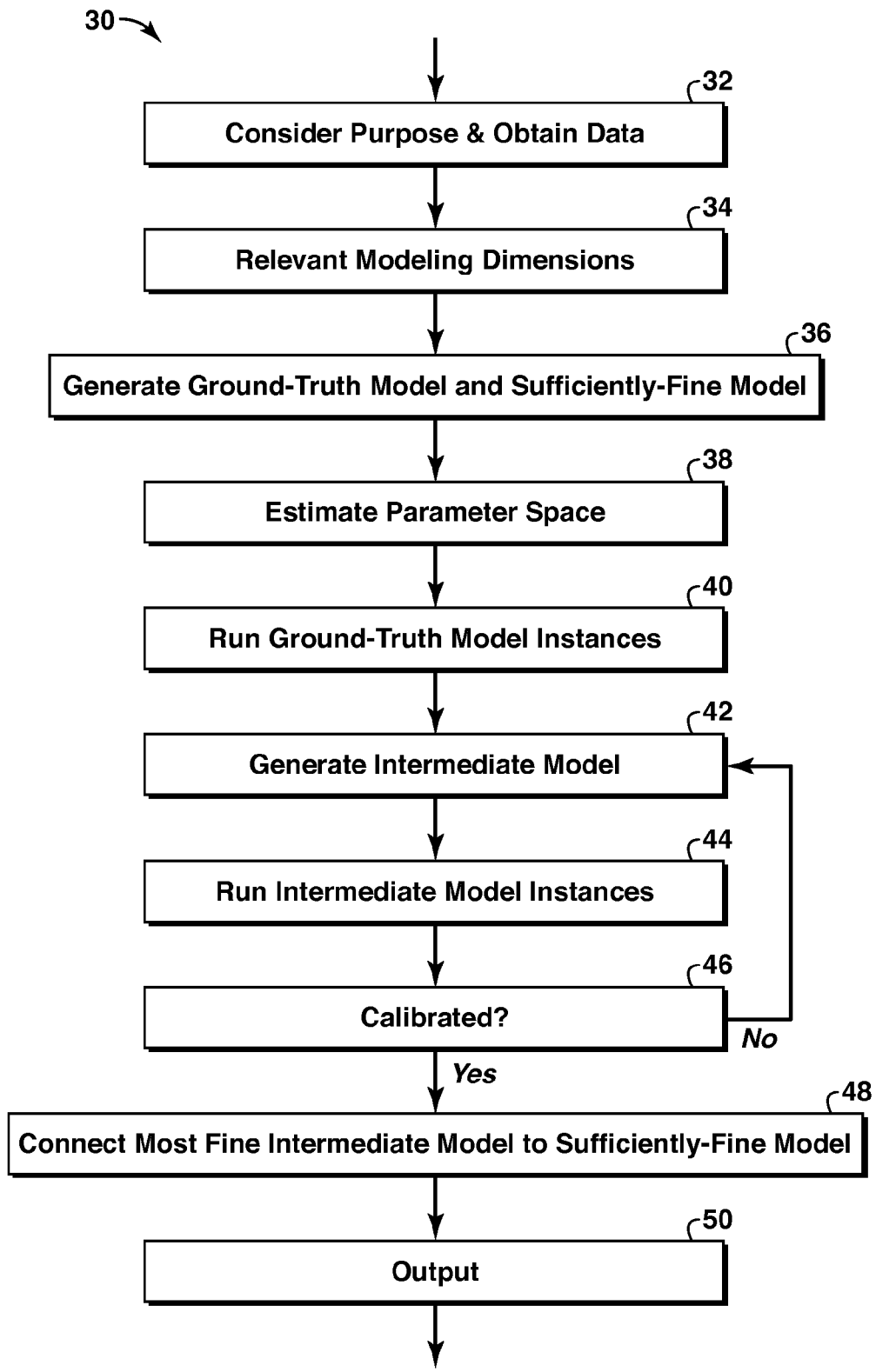
FIG. 3 is a flowchart showing a method of generating a model hierarchy.

FIG. 3 is a flowchart showing a method 30 of hierarchical modeling according to aspects of the disclosed methodologies and techniques. At block 32 the purpose of the model is considered and analyzed. The purpose may be a question to be answered or a decision to be made. Example questions or decisions may include those relating to hydrocarbon management. Data relevant to the purpose may be obtained and analyzed. A computer system, such as the computer system shown in FIG. 6 and described herein, may be used to organize and analyze the data. Analyzing the data should assist in identifying relevant parameters and uncertainties. Based on the data, at block 34 relevant modeling dimensions are identified to represent the relevant model parameters and uncertainties. All relevant model parameters and uncertainties should be represented such that there are multiple dimensions, as shown in FIG. 2. It may be necessary for a user to build a few models of the system to get a sense of what parameters and dimensions are needed to approximate accurately the system. At block 36 a ground-truth model is generated comprising the estimated ground-truth level of detail at each dimension. A sufficiently-fine model is generated comprising the estimated sufficiently-fine level of detail at each dimension.

Figure 4:
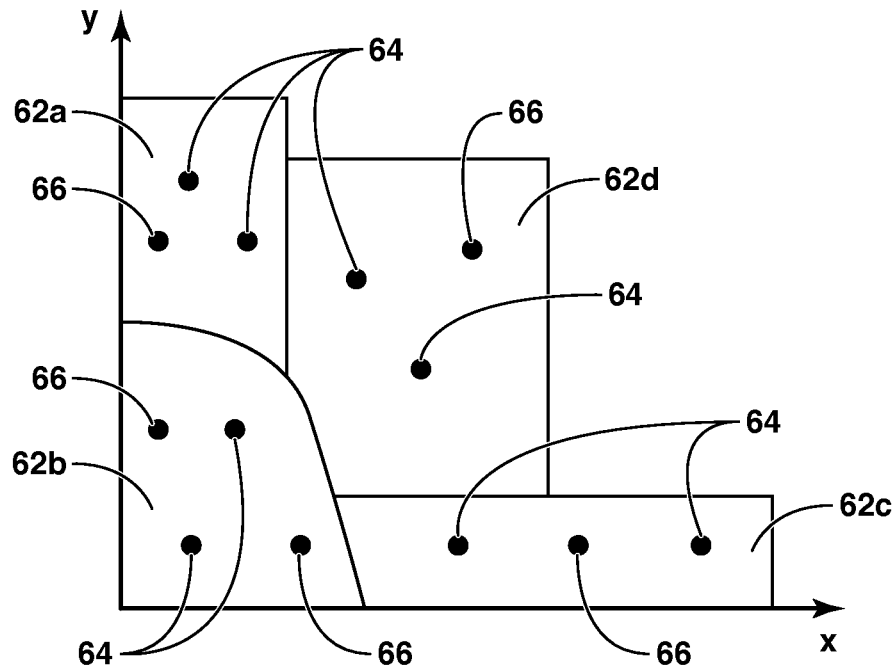
FIG. 4 is a graph showing a parameter space.

At block 38 a parameter space is estimated. FIG. 4 depicts a parameter space 60 expressed by two independent parameters x and y. The parameter space expresses outcomes of various model instances for a given sufficiently-fine model. At block 40 a small number (between 3 and 30, for example) of model instances at the ground-truth level of detail are built and run through the ground-truth model. The ground-truth model instances should be varied enough to sample key regions 62a-62d of the parameter space. Further, the model instances should be varied enough to cover anticipated sensitivities. These initial model instances are shown in FIG. 4 as points 64. At block 42 a first intermediate model is generated by identifying, at each dimension, a first intermediate level of detail generally between the ground-truth level of detail and the sufficiently-fine levels of detail. This may be accomplished by using one or more techniques such as local flow-based and global flow-based techniques. Level of detail corrections and offsets may be applied to account for random and systematic errors that may arise. The first intermediate level of detail is shown in FIG. 2 as a dashed line 29a. At block 44 first intermediate model instances, based on the first intermediate level of detail, are generated and run through the first intermediate model. These first intermediate model instances are shown in FIG. 4 as points 66. These new model instances are selected to maximize the spacing between points 66 in the parameter space while remaining within a desired range of the parameter space. At block 46 model metrics are used to determine whether the first intermediate model is sufficiently accurate, or calibrated, to the ground-truth model. Model metrics may include but are not limited to compartmentalization (no-flows or low-flows), connectedness or channelization, well drainage volumes, well productivity indices (PIs), well critical rates, intercompartmental PIs, aquifer PIs, and stability numbers for gas or water drive. A comparison of model metrics associated with the first intermediate model (and its associated results) and the ground-truth model (and its associated results) may indicate when the first intermediate model is sufficiently calibrated or connected to the ground-truth model. In this context, "adequately calibrated" or "sufficiently calibrated" means that one of ordinary skill would judge that the first intermediate model can be used as a proxy for the more detailed ground-truth model with an acceptable level of error. The level of acceptable error, and by implication the definition of "sufficient" used herein, depends on the modeled system, the anticipated use of the hierarchy of models, a dimension's sensitivity to changes in level of detail, computing requirements, and/or a user's judgment. Further model instances based on the first intermediate model may be generated and run if the previously generated intermediate model instances insufficiently cover the parameter space. If the first intermediate model is not sufficiently linked or calibrated, additional intermediate models are generated by repeating the steps in blocks 42 and 44 until the models are adequately calibrated. A second intermediate level of detail, associated with a second intermediate model, is represented in FIG. 2 as a dashed line 29b. At block 48 the intermediate model having the most fine detail is used to calibrate or connect to the sufficiently-fine model, either through the previously disclosed steps or through an analytical model reduction technique such as principal component analysis or input/output mapping, which converts the sufficiently-fine model from one with identifiable representations of physics to one that is mathematical. At block 54 one or more model instances from one or more models are displayed or otherwise outputted for further use.

An example of how the intermediate model having the most fine detail is connected or calibrated to the sufficiently-fine model is to connect or calibrate said intermediate model to an intermediate model having a lesser level of detail, and then connect or calibrate the intermediate model having the lesser level of detail to the sufficiently-fine model. If a model cannot be connected or calibrated sufficiently to the next model (as explained herein), one or more additional intermediate models may be generated generally therebetween according to aspects disclosed herein. Specifically, the intermediate model is identified that has the coarsest level of detail (i.e., closest to the sufficiently-fine model) and that is sufficiently calibrated, directly or indirectly through other intermediate models, to the ground-truth model. If none of the remaining generated models (which can include other intermediate models and the sufficiently-fine model) can be sufficiently calibrated to the intermediate model calibrated to the ground-truth model, an additional intermediate model may generated that has a level of detail generally more coarse than the calibrated intermediate model. If the additional intermediate model can not be sufficiently calibrated to the calibrated intermediate model, another additional intermediate model is generated having a level of detail generally more fine than the first additional intermediate model and that is sufficiently calibrated to the first additional intermediate model. When the additional intermediate model can be sufficiently calibrated to the calibrated intermediate model, it becomes the most coarse intermediate model sufficiently calibrated to the ground-truth model, albeit indirectly. The process continues until a chain of intermediate models is defined between the ground-truth model and the sufficiently-fine model, each model in the chain being sufficiently calibrated to the next model in the chain more coarse than itself and the next model in the chain more fine than itself. In this manner the ground-truth model is connected and sufficiently calibrated to the sufficiently-fine model, through intermediate models. Of course, if the ground-truth model and the sufficiently-fine model can be sufficiently calibrated to each other, an intermediate model is not necessary.

Figure 5:
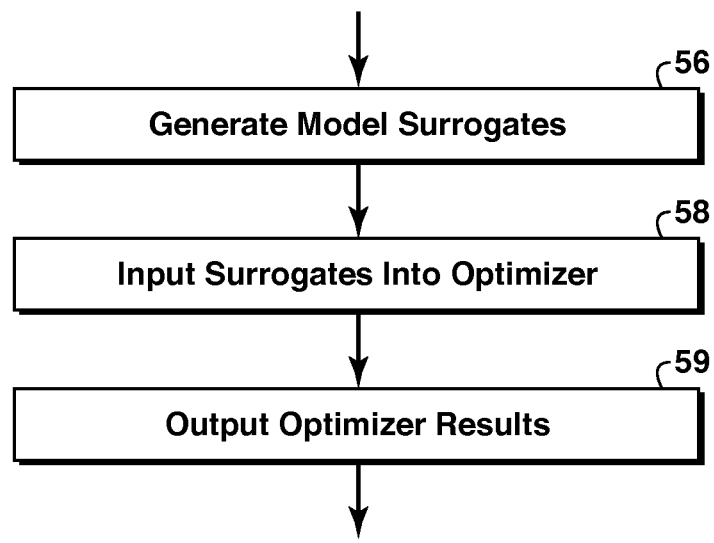
FIG. 5 is a flowchart showing a method of optimizing results.

Once it is determined an intermediate model and/or the sufficiently-fine model (i.e., the higher-speed models) are calibrated to the ground-truth model (i.e., the high-fidelity model) through one or more intermediate models, the model instances at the highest-speed level of detail may be used to approximate the system in various applications, such as an optimization routine. An optimization routine using the calibrated high-speed model instances can be expected to provide accurate outputs while using less computing time and expense than what would be required had the high-fidelity model instances been used. It may be preferable, however, to convert the model instances into a form that is more conducive to be used in such an optimizer. FIG. 5 depicts a method that may be used with other aspects disclosed herein. At block 56 model instances associated with the sufficiently-fine model are used to generate model surrogates. The model surrogates may include an equation or formula that is more easily used by an optimization routine. At block 58 the surrogates are input into an optimization routine. At block 59 the outputs of the optimization routine may be displayed or otherwise outputted as desired.

Methodologies and techniques disclosed herein may require additional iterations of the disclosed processes. For example, excessive run times when computing model instances may suggest the associated model is too detailed, and a more coarse model should be developed. Inadequate calibration—when model instances at a coarser level of detail do not adequately correspond to model instances at a finer level of detail—may suggest modification to the definition of either the coarser model or the finer model. Additionally, early attempts to apply the model hierarchy to a system may be unsuccessful, thus requiring the entire process to be repeated. Of course, learnings from attempts to apply the model hierarchy may be used to improve subsequent attempts. In particular, it should be possible to narrow down the regions of modeling space relevant to the problem to improve accuracy and reduce modeling cost.

Data, flow simulations and error analysis may be used to produce error metrics throughout the model hierarchy. The representativeness of each model for its region of the parameter space may be estimated. A response-surface type of treatment may be used to estimate model behavior within a region. The modeling activity required to produce a full model hierarchy can be substantial, so that specialized systems, such as that proposed by active modeling (described herein) may be needed. Regardless of how the model hierarchy is produced, the fine-level of detail models for each dimension interact with the validation and calibration against the physics, and the coarse-level of detail models for each dimension interact with optimizers or other tools requiring rapid modeling. Each model hierarchy is adapted to its particular purpose or to a specific problem to be solved, and therefore may require different levels of detail in different dimensions. The computational effort associated with validating the model hierarchy may necessitate cycling through the modeling dimensions and addressing each individually. Although the dimensions, models, levels of detail, and metrics may in general be different for each question or problem to be modeled, most of the model hierarchy will typically be useful for related situations. Calibration may occur both at centrally located points in parameter space and/or at extremes, so that behavior within the region is found by interpolation. However, limitations on computation may require modeling the behavior of many regions of parameter space associated with the model hierarchy to be extrapolated rather than interpolated. Furthermore, for applications in which different courses of action of different resolutions of uncertainties are to be compared, the model hierarchy may include dimensions to cover or account for all relevant potential outcomes. This proliferation of potential outcomes further highlights a need for high-speed models.

Data input may be accomplished by one or more methods such as manual data entry, spreadsheets, and databases. A user may use any known software to implement data storage and retrieval for the input data, which can then be linked to the model hierarchy through computer programming languages. Data input may include specifications of model parameters with their uncertainties (probability distributions, and mode and time of resolution), constraints (equality or inequality, hard or soft), reservoir properties, facilities, business/economic data, political factors, and decision variables (including the time when they will be implemented), etc. The data input is used to populate the model. The mathematical model is then solved, and the output may be displayed and/or used to generate reports, calculations, tables, figures, charts, and the like, which may be used in various hydrocarbon management activities and decisions. The mathematical model may be used in an iterative process to test multiple cases, subsequently comparing the cases side-by-side as part of the process.

New information, unless completely redundant with existing data, may lead at a minimum to a reduction in uncertainty, and usually to a shift (large or small) in parameter space. For small shifts, an adjustment of the functions in the uncertainty dimension may be sufficient to account for the change. It should be possible to re-use much of the infrastructure used in the development of the original/immediate-past hierarchy. This includes the re-use of the models themselves at all levels of detail, with an adjustment in their probabilities to account for the new data. For modest-to-large changes, the model hierarchy may need to be revised. Such revisions may include generating or removing model instances at one or more levels of detail, and in extreme cases may include a complete re-generation of the dimensions. Because the revisions typically are embedded in the planning process, re-work will be needed less frequently. Any new information that has been anticipated to some extent and accounted for may not necessarily require an update to the model system.

The calibration across models may be accomplished through the use of multiple, complex distance metrics (see for example, Caers and Park (2008)) to quantify the differences between models. The distance metrics are measured both in terms of the characteristics/properties of the models and in their outputs, such as well rates or pressures. Some of the distance metrics may be effectively independent of the modeling objective/purpose. Other distance metrics may be functions of the decision or recovery process under consideration, such as metrics related to gas displacement that only apply to gas-drive recovery processes.

The number of intermediate models in the model hierarchy—between the ground-truth model and the sufficiently-fine model—is adjustable to the specific purpose and/or the desired output of the model hierarchy. On one hand it would be more efficient to minimize the number of intermediate models. On the other hand, a large difference between adjacent models in the model hierarchy might invalidate the modeling. It may be that a three-level hierarchy works best in many applications. Additional models having intermediate level of detail may be added when for example the links between models become poorly calibrated. An intermediate-level of detail model could be removed from the model hierarchy if it were determined that its adjacent models (i.e., the model more coarse and the model more fine) could be adequately calibrated. It is also possible that the number of models may vary for different dimensions.

Aspects disclosed herein discuss intermediate models having levels of detail generally between levels of detail associated with previously defined models. Such a description includes instances where the level of detail at each dimension is changed from the levels of detail in a previously defined model. Such a description also includes instances where the level of detail at one or more dimensions is changed from a previously defined model and the level of detail at the remaining dimensions is unchanged from previously defined models. Users or automated processes therefore may vary the detail at less than all dimensions to see whether such changes would create a new intermediate model that may be sufficiently calibrated or connected to a previously defined model.

In another aspect, a technique called active modeling may be used to construct the model hierarchy. In active modeling, an automated set of processes not only sets up and runs the detailed validation cases, but also constructs the entire hierarchy and calibrates the high-speed models. First, all the input data are quantified and encoded, and the modeling range is determined Using the desired accuracy and estimated costs, the automated processes sets up and runs a number of high-fidelity cases. Once the high-fidelity cases start completing, calibration metrics and heuristics are used to construct appropriate coarser models/cases. The active modeling technique may be embedded in computer code as disclosed herein.

Figure 6:
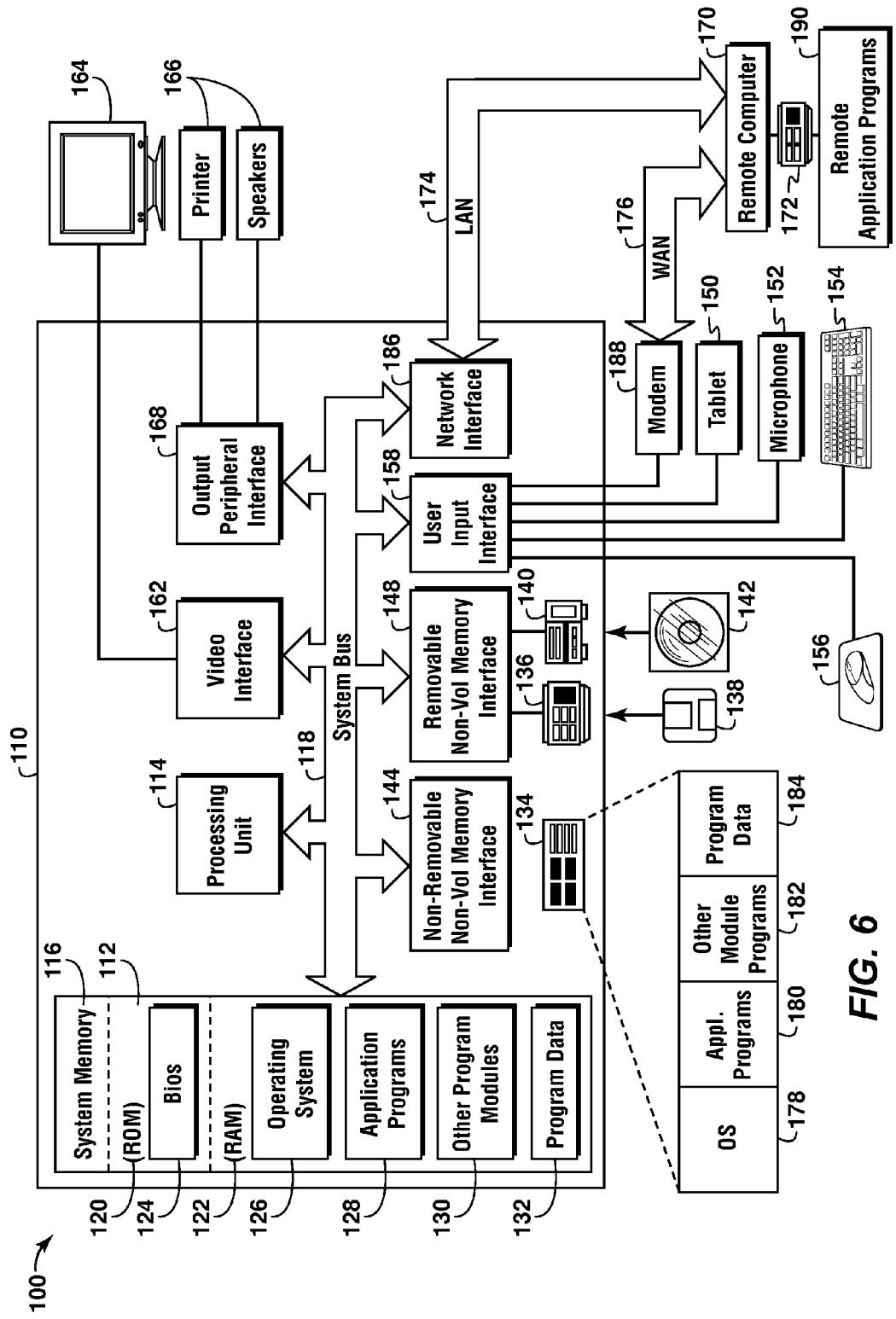
FIG. 6 is a simplified diagram of a computing environment.

FIG. 6 illustrates a system of a computing environment 100 for implementing disclosed aspects. Computing environment 100 includes a computing device in the form of a computing system 110, which may be a UNIX-based workstation or commercially available from Intel, IBM, AMD, Motorola, Cyrix and others. Components of the computing system 110 may include, but are not limited to, a processing unit 114, a system memory 116, and a system bus 146 that couples various system components including the system memory to the processing unit 114. The system bus 146 may be any of several types of bus structures including a memory bus or memory controller, a peripheral bus, and a local bus using any of a variety of bus architectures.

Computing system 110 typically includes a variety of computer readable media. Computer readable media may be any available media that may be accessed by the computing system 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing system 10.

The system memory 116 includes computer storage media in the form of volatile and/or nonvolatile memory such as read only memory (ROM) 120 and random access memory (RAM) 122. A basic input/output system 124 (BIOS), containing the basic routines that help to transfer information between elements within computing system 110, such as during start-up, is typically stored in ROM 120. RAM 122 typically contains data and/or program modules that are immediately accessible to and/or presently being operated on by processing unit 114. By way of example, and not limitation, FIG. 6 illustrates operating system 126, application programs 130, other program modules 130 and program data 132.

Computing system 110 may also include other removable/non-removable, volatile/nonvolatile computer storage media. By way of example only, FIG. 6 illustrates a hard disk drive 134 that reads from or writes to non-removable, nonvolatile magnetic media, a magnetic disk drive 136 that reads from or writes to a removable, nonvolatile magnetic disk 138, and an optical disk drive 140 that reads from or writes to a removable, nonvolatile optical disk 142 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 134 is typically connected to the system bus 146 through a non-removable memory interface such as interface 144, and magnetic disk drive 136 and optical disk drive 140 are typically connected to the system bus 146 by a removable memory interface, such as interface 148.

The drives and their associated computer storage media, discussed above and illustrated in FIG. 6, provide storage of computer readable instructions, data structures, program modules and other data for the computing system 110. In FIG. 6, for example, hard disk drive 134 is illustrated as storing operating system 178, application programs 180, other program modules 182 and program data 184. These components may either be the same as or different from operating system 126, application programs 130, other program modules 130, and program data 132. Operating system 178, application programs 180, other program modules 182, and program data 184 are given different numbers hereto illustrates that, at a minimum, they are different copies.

A user may enter commands and information into the computing system 110 through input devices such as a tablet, or electronic digitizer, 150, a microphone 152, a keyboard 154, and pointing device 156, commonly referred to as a mouse, trackball, or touch pad. These and other input devices often may be connected to the processing unit 114 through a user input interface 158 that is coupled to the system bus 118, but may be connected by other interface and bus structures, such as a parallel port, game port or a universal serial bus (USB).

A monitor 160 or other type of display device may be also connected to the system bus 118 via an interface, such as a video interface 162. The monitor 160 may be integrated with a touch-screen panel or the like. The monitor and/or touch screen panel may be physically coupled to a housing in which the computing system 110 is incorporated, such as in a tablet-type personal computer. In addition, computers such as the computing system 110 may also include other peripheral output devices such as speakers 164 and printer 166, which may be connected through an output peripheral interface 168 or the like.

Computing system 110 may operate in a networked environment using logical connections to one or more remote computers, such as a remote computing system 170. The remote computing system 170 may be a personal computer, a server, a router, a network PC, a peer device or other common network node, and typically includes many or all of the elements described above relative to the computing system 110, although only a memory storage device 172 has been illustrated in FIG. 6. The logical connections depicted in FIG. 6 include a local area network (LAN) 174 connecting through network interface 186 and a wide area network (WAN) 176 connecting via modem 188, but may also include other networks. Such networking environments are commonplace in offices, enterprise-wide computer networks, intranets and the Internet.

For example, computer system 110 may comprise the source machine from which data is being migrated, and the remote computing system 170 may comprise the destination machine. Note however that source and destination machines need not be connected by a network or any other means, but instead, data may be migrated via any machine-readable media capable of being written by the source platform and read by the destination platform or platforms.

The central processor operating system or systems may reside at a central location or distributed locations (i.e., mirrored or stand-alone). Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. For example, a storage medium may be coupled to the processor such that the processor may read information from, and write information to, the storage medium. In the alternative, the storage medium may be integral to the processor. The processor and the storage medium may also reside in an application-specific integrated circuit (ASIC). The bus may be an optical or conventional bus operating pursuant to various protocols that are well known in the art. One system that may be used is a Linux workstation configuration with a Linux 64-bit or 32-bit Red Hat Linux WS3 operating system, and an NVIDIA Quadro graphics card. However, the system may operate on a wide variety of hardware.

Figure 7A:
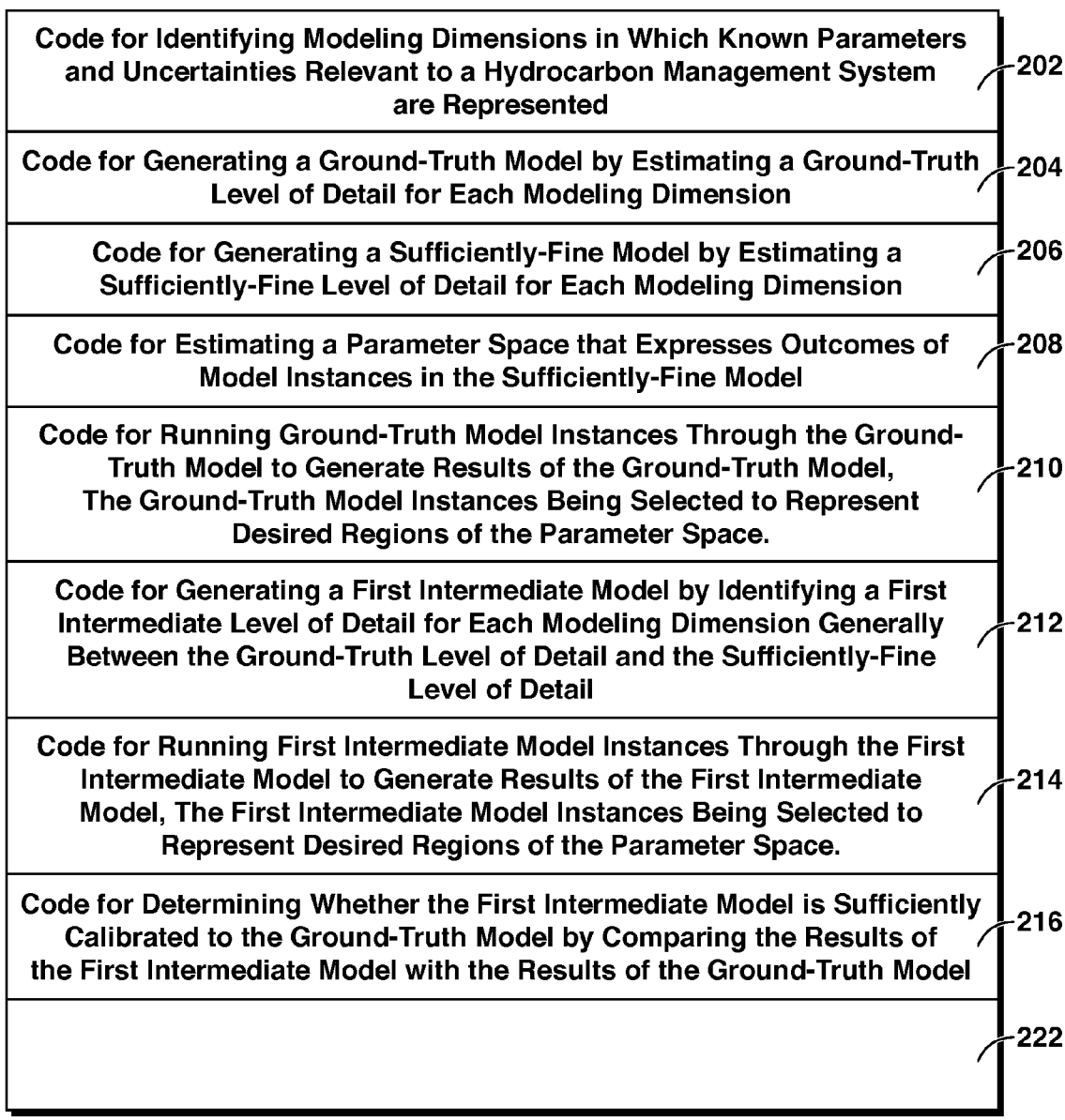

FIGS. 7A and 7B comprise a block diagram of a representation of machine-readable code 200 that may be used with a computing system such as computing system 110. At block 202, code is provided for identifying modeling dimensions in which known parameters and uncertainties relevant to a hydrocarbon management system are represented. At block 204, code is provided for generating a ground-truth model by estimating a ground-truth level of detail for each modeling dimension. At block 206, code is provided for generating a sufficiently-fine model by estimating a sufficiently-fine level of detail for each modeling dimension. At block 208, code is provided for estimating a parameter space that expresses outcomes of model instances in the sufficiently-fine model. At block 210, code is provided for running ground-truth model instances to generate results of the ground-truth model, the ground-truth model instances being selected to represent desired regions of the parameter space. At block 212, code is provided for generating a first intermediate model by identifying a first intermediate level of detail for each modeling dimension generally between the ground-truth level of detail and the sufficiently fine level of detail. At block 214, code is provided for running first intermediate model instances to generate results of the first intermediate model, the first intermediate model instances being selected to represent desired regions of the parameter space. At block 216, code is provided for determining whether the first intermediate model is sufficiently calibrated to the ground-truth model by comparing the results of the first intermediate model with the results of the ground-truth model. At block 218, code is provided for generating, when the first intermediate model is not sufficiently calibrated to the ground-truth model, a second intermediate model by identifying a second intermediate level of detail generally between the ground-truth level of detail for each modeling dimension and the first intermediate level of detail for each modeling dimension, and running second intermediate model instances to generate results of the second intermediate model, after which it is determined whether the second intermediate model is sufficiently calibrated to the ground-truth model by comparing the results of the second intermediate model with the results of the ground-truth model. At block 220, code is provided for connecting one of the first and second intermediate models to the sufficiently-fine model when one of the first and second intermediate models is sufficiently calibrated to the ground-truth model. Code effectuating or executing other features of the disclosed aspects and methodologies may be provided as well. This additional code is represented in FIG. 7A as block 222, and may be placed at any location within code 200 according to computer code programming techniques.

Disclosed aspects may be used in hydrocarbon management activities, such as reservoir evaluation, development planning, and reservoir management. In these and other applications, the model hierarchy may be used to predict the behavior of the system (the reservoir and any other parts of the system that are modeled) under a proposed set of actions and controls. As a non-limiting example, hydrocarbon reservoir and facility simulators model the movement of gas and/or other liquids in hydrocarbon reservoirs and surface facilities respectively. By performing numerical simulations, users can gain understanding of the reservoir structure flow of fluids through the reservoir and facilities. Commercial reservoir and/or facility simulation software may be obtained, or simulators may be developed from scratch using a computer programming language by practitioners in the field. In any event, the disclosed aspects may be used to provide high-speed and/or high-fidelity model instances to the simulators.

Although the discussion herein has focused primarily on using model instances from higher-speed levels of detail for use in an application requiring rapid model evaluation, it is also possible to use model instances from high-fidelity levels of detail (such as the ground-truth level of detail), where model instances in selected regions of uncertainty/decision/modeling space are desired or needed for detailed sample predictions of behavior. Furthermore, the disclosed aspects may be useful for modeling behavior of a system, such as a hydrocarbon reservoir, without an optimization tool. The high-speed models may be used for rapid screening of potential field development or reservoir management strategies across uncertainty space. Even without uncertainty, the disclosed aspects may be applied to a parameter space of varying flow conditions to determine the sensitivity of behavior to controls that could potentially be applied.

The following are non-limiting hydrocarbon management scenarios that may benefit from the disclosed methodologies and techniques.

1. Brownfield Evaluation. A large, but mostly depleted reservoir is being offered for sale. Thirty years of data have been accumulated and are available. Traditional approaches are used to narrow down the possibilities for unrecovered oil and improved recovery methods. A model hierarchy may be built to assess the remaining uncertainty and determine the probabilities of recovering various amounts of oil under possible recovery processes. Based on the cost of recovery and expected sales price of the oil, a rational decision about whether to purchase the reservoir can be made.

2. Development Planning, Large Offshore Field. To determine the best set of facilities to be fabricated and used for developing a large, offshore petroleum field, the probability distributions of the various properties of the field are determined, as well as uncertainties in cost, price and other economic factors. A model hierarchy is developed to represent the system and its uncertainties. This is integrated with an optimizer, as discussed herein, to determine the development plan with the best net expected value. Use of stochastic programming (for example) in the optimizer will identify the plan with the highest net present value. Alternatively, robust optimization may be used to find the development plan with the least exposure to downside risk.

3. Reservoir Management. A relatively new field has been on production for a few years, but development wells are still being drilled. Production is substantially higher than originally expected. It is desired to compare the original drilling plan with three other strategies. Using production data and all known geology, a model hierarchy is developed, and the four strategies (the original and the three newly proposed) are compared. Probability profiles for oil recovery and net present value are developed for all four strategies. Based on the expected value for the oil, the strategy with the highest expected net present value is chosen.

Figure 8:
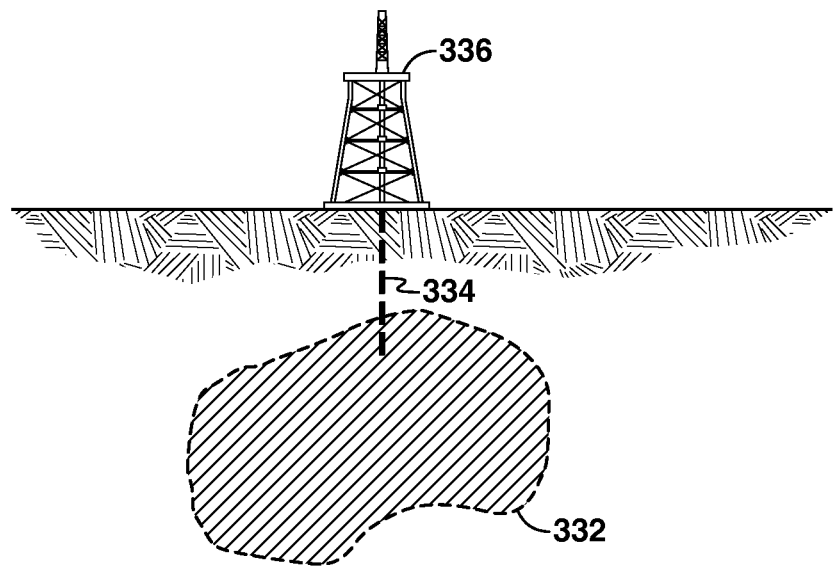
FIG. 8 is a side elevational diagram of a subsurface region.
Figure 9:
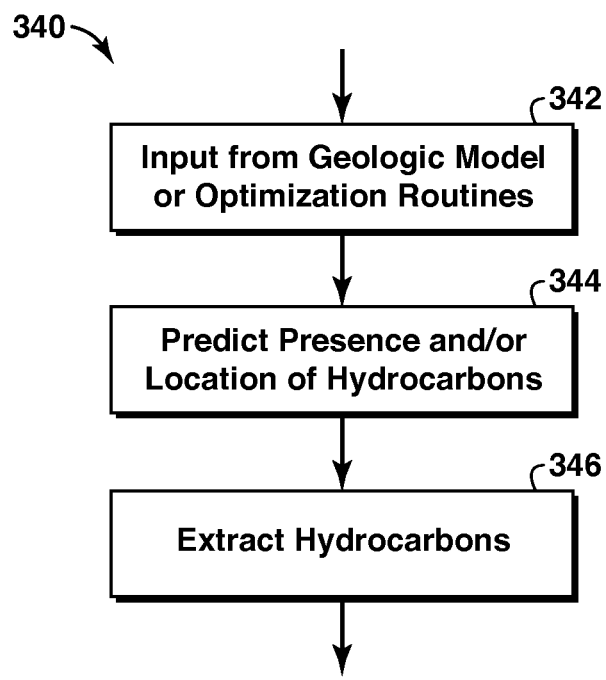
FIG. 9 is a flowchart showing a method of extracting hydrocarbons.

In another aspect, the disclosed methodologies and techniques may be used to extract hydrocarbons from a subsurface region, which is indicated by reference number 332 in FIG. 8. A method 340 of extracting hydrocarbons from subsurface reservoir 332 is shown in FIG. 9. At block 342 inputs are received from a geologic model of the subsurface region, where the geologic model as been improved using the methods and aspects disclosed herein. At block 344 the presence and/or location of hydrocarbons in the subsurface region is predicted. At block 346 hydrocarbon extraction is conducted to remove hydrocarbons from the subsurface region, which may be accomplished by drilling a well 334 using oil drilling equipment 336 (FIG. 8). Other hydrocarbon extraction activities may be performed according to known principles.

Aspects disclosed herein differ in many ways from previous known methods and approaches to system modeling. To cite a few non-limiting examples, the disclosed aspects permit the systematic treatment of the entire development planning/reservoir management problem and address the requirements of the decision, physics, and uncertainties of all kinds. Furthermore, uncertainty and model detail are addressed simultaneously. Other approaches create individual "parameter-space points" such as in Top Down Reservoir Modeling, as cited in Schulze-Riegert et al., but do not consider the models to represent regions in both decision/operational space and uncertainty space.

Other known approaches develop response surfaces to represent system behavior (e.g. Scheidt, et al., 2004), but these are simplistic functions that cannot capture the complexities of the actual system. In physical terms, these simplifications effectively become arbitrary system constraints—that are not explicitly acknowledged. Their effect on the solution is not known. In contrast, the disclosed methodologies and techniques build an appropriately complex response system and take into account all relevant imposed constraints. Furthermore, the disclosed methodologies and techniques develop complex metrics to calibrate models across all levels of detail. Known approaches have developed simple metrics, but these global scalar approaches cannot organize the relationships between behavior except in simple synthetic systems.

The disclosed embodiments and methodologies may be susceptible to various modifications and alternative forms and have been shown only by way of example. The disclosed embodiments and methodologies are not intended to be limited to the particular embodiments disclosed herein, but include all alternatives, modifications, and equivalents falling within the spirit and scope of the appended claims.

What is claimed is:

1. A method of development planning in a hydrocarbon management scenario, comprising:
creating a hierarchy of models of a hydrocarbon management system, comprising:
obtaining a sufficiently-fine level of detail and a ground truth level of detail, wherein the sufficiently-fine level of detail is a coarser level of detail as compared to the ground-truth level of detail for each modeling dimension;
identifying modeling dimensions in which known parameters and uncertainties relevant to the hydrocarbon management system are represented;
generating a ground-truth model based on the ground-truth level of detail for each modeling dimension;
generating a sufficiently-fine model based on the sufficiently-fine level of detail for each modeling dimension;
estimating a parameter space that expresses outcomes of model instances in the sufficiently-fine model;

using a computer, running ground-truth model instances to generate results of the ground-truth model, the ground-truth model instances being selected to represent desired regions of the parameter space;

generating a first intermediate model by identifying a first intermediate level of detail for each modeling dimension generally between the ground-truth level of detail and the sufficiently fine level of detail;

using a computer, running first intermediate model instances to generate results of the first intermediate model, the first intermediate model instances being selected to represent desired regions of the parameter space;

determining whether the first intermediate model is sufficiently calibrated to the ground-truth model by comparing the results of the first intermediate model with the results of the ground-truth model, wherein sufficiently calibrated means that the first intermediate model can be used as a proxy for the ground-truth model to enable a development planning decision to be made;

when the first intermediate model is not sufficiently calibrated to the ground-truth model,
generating a second intermediate model by identifying a second intermediate level of detail generally between the ground-truth level of detail for each modeling dimension and the first intermediate level of detail for each modeling dimension,
running second intermediate model instances to generate results of the second intermediate model,
determining whether the second intermediate model is sufficiently calibrated to the ground-truth model by comparing the results of the second intermediate model with the results of the ground-truth model;

when one of the first and second intermediate models is sufficiently calibrated to the ground-truth model, connecting one of the first and second intermediate models to the sufficiently-fine model;

outputting one or more model instances of the sufficiently-fine model, the first intermediate model instances, and the second intermediate model instances;

making a decision regarding size, timing, or location of a production facility, a potential subsequent expansion of a production facility, or a connection to a production facility based at least in part on the output model instances; and causing the decision to be performed for the production facility.

2. The method of claim 1, wherein all known said parameters and uncertainties are represented in the modeling dimensions.

3. The method of claim 1, wherein the uncertainties relevant to the purpose of the model are represented in a single modeling dimension.

4. The method of claim 1, wherein the uncertainties relevant to the purpose of the model are represented in more than one modeling dimension.

5. The method of claim 1, further comprising generating model surrogates using the outputted model instances, the model surrogates approximating the hydrocarbon management system.

6. The method of claim 5, wherein the model surrogates comprise one or more equations or formulas that approximate the hydrocarbon management system.

7. The method of claim 5, further comprising:
inputting the generated model surrogates into an optimization routine; and
outputting results of the optimizer.

8. The method of claim 1, further comprising repeatedly completing the following steps until one of the generated intermediate models is sufficiently calibrated to the ground-truth model:
generating an additional intermediate model by identifying an additional intermediate level of detail between two of the previously generated levels of detail for each modeling dimension;
running model instances associated with the additional intermediate model through the additional model to generate results of the additional intermediate model; and
determining whether the additional intermediate model is sufficiently calibrated to the ground-truth model by comparing the results of the additional intermediate model with the results of the ground-truth model.

9. The method of claim 1, wherein the ground-truth level of detail associated with one of the modeling dimensions is different from the ground-truth level of detail associated with another of the modeling dimensions.

10. The method of claim 1, wherein the ground-truth level of detail is the coarsest level of detail that can fully model the hydrocarbon management system such that further refinement of that coarsest level of detail does not materially impact predicted behavior of the hydrocarbon management system.

11. The method of claim 1, wherein the known parameters represented by the modeling dimensions include one or more of geologic detail, fluid representation, production representation, economic modeling, and political considerations.

12. The method of claim 1, wherein the results of the first intermediate model and the results of the ground-truth model comprise at least one of compartmentalization, connectedness, channelization, well drainage volumes, well productivity indices, well critical rates, intercompartmental productivity indices, aquifer indices, and stability numbers for gas and water drive.

13. The method of claim 1, wherein connecting one of the first and second intermediate models to the sufficiently-fine model comprises:
(a) identifying the intermediate model having the coarsest level of detail and that is sufficiently calibrated, directly or indirectly, to the ground-truth model;
(b) if none of the remaining generated models can be sufficiently calibrated to said intermediate model sufficiently calibrated to the ground-truth model, generating a first additional intermediate model having a level of detail generally more coarse than said intermediate model sufficiently calibrated to the ground-truth model;
(c) when the first additional intermediate model cannot be sufficiently calibrated to said intermediate model sufficiently calibrated to the ground-truth model, generating a second intermediate model having a level of detail generally more fine than the first additional intermediate model and that is sufficiently calibrated to the first additional intermediate model;
(d) when the additional intermediate model can be sufficiently calibrated to said intermediate model sufficiently calibrated to the ground-truth model, repeating steps (a), (b), and (c) to generate more additional intermediate models until the ground-truth model is sufficiently calibrated to the sufficiently-fine model through one or more intermediate models.

14. The method of claim 1, further comprising:
    determining whether the first intermediate model instances represent desired regions of the parameter space;
    generating supplemental first intermediate model instances when the first intermediate model instances do not represent desired regions of the parameter space; and
    running the supplemental first intermediate model instances to generate supplemental results of the first intermediate model that are included with the results of the first intermediate model.

15. The method of claim 1, wherein the hydrocarbon management system comprises at least one hydrocarbon reservoir.

16. The method of claim 1, wherein the hydrocarbon management system comprises hydrocarbon extraction equipment.

17. A tangible, non-transitory machine-readable medium containing code stored thereon, the code comprising:
    (a) code for obtaining a sufficiently-fine level of detail and a ground truth level of detail, wherein the sufficiently-fine level of detail is a coarser level of detail as compared to the ground-truth level of detail for each modeling dimension;
    (b) code for identifying modeling dimensions in which known parameters and uncertainties relevant to a hydrocarbon management system are represented;
    (c) code for generating a ground-truth model by estimating a ground-truth level of detail for each modeling dimension;
    (d) code for generating a sufficiently-fine model associated with a hydrocarbon management scenario by estimating a sufficiently-fine level of detail for each modeling dimension, wherein
    when the hydrocarbon management scenario is a brownfield evaluation, sufficiently-fine level of detail means suitable detail to determine the probabilities of recovering various amounts of oil under possible recovery processes,
    when the hydrocarbon management scenario is a development planning scenario for a large offshore field, sufficiently-fine level of detail means suitable detail to determine a development plan based on net expected value, net present value, or exposure to downside risk, and
    when the hydrocarbon management scenario is a reservoir management scenario, sufficiently-fine level of detail means suitable detail for choosing a strategy with a highest expected net present value;
    (e) code for estimating a parameter space that expresses outcomes of model instances in the sufficiently-fine model;
    (f) code for running ground-truth model instances to generate results of the ground-truth model, the ground-truth model instances being selected to represent desired regions of the parameter space;
    (g) code for generating a first intermediate model by identifying a first intermediate level of detail for each modeling dimension generally between the ground-truth level of detail and the sufficiently fine level of detail;
    (h) code for running first intermediate model instances to generate results of the first intermediate model, the first intermediate model instances being selected to represent desired regions of the parameter space;
    (i) code for determining whether the first intermediate model is sufficiently calibrated to the ground-truth model by comparing the results of the first intermediate model with the results of the ground-truth model, wherein sufficiently calibrated means that the first intermediate model can be used as a proxy for the ground-truth model to enable a development planning decision to be made;
    (j) code for generating, when the first intermediate model is not sufficiently calibrated to the ground-truth model, a second intermediate model by identifying a second intermediate level of detail generally between the ground-truth level of detail for each modeling dimension and the first intermediate level of detail for each modeling dimension,
    running second intermediate model instances to generate results of the second intermediate model, determining whether the second intermediate model is sufficiently calibrated to the ground-truth model by comparing the results of the second intermediate model with the results of the ground-truth model;
    (k) code for connecting one of the first and second intermediate models to the sufficiently-fine model when one of the first and second intermediate models is sufficiently calibrated to the ground-truth model; and
    (l) code for outputting one or more model instances of the sufficiently-fine model, the first intermediate model instances, and the second intermediate model instances.

18. The computer program product of claim 17, further comprising code for outputting one or more model instances of the sufficiently-fine model, the first intermediate model instances, and the second intermediate model instances.

19. The computer program product of claim 17, further comprising:
    code for generating model surrogates using the outputted model instances, the model surrogates being one or more equations or formulas that approximate the hydrocarbon management system; and
    code for optimizing the generated model surrogates.

20. A method of extracting hydrocarbons from a subsurface region, comprising:
    obtaining a sufficiently-fine level of detail and a ground truth level of detail, wherein the sufficiently-fine level of detail is a coarser level of detail as compared to the ground-truth level of detail for each modeling dimension;
    identifying modeling dimensions in which known parameters and uncertainties relevant to the hydrocarbon management system are represented;
    generating a ground-truth model based on the ground-truth level of detail for each modeling dimension;
    generating a sufficiently-fine model based on the sufficiently-fine level of detail for each modeling dimension;
    estimating a parameter space that expresses outcomes of model instances in the sufficiently-fine model;
    running ground-truth model instances to generate results of the ground-truth model, the ground-truth model instances being selected to represent desired regions of the parameter space;
    generating a first intermediate model by identifying a first intermediate level of detail for each modeling dimension generally between the ground-truth level of detail and the sufficiently fine level of detail;

running first intermediate model instances to generate results of the first intermediate model, the first intermediate model instances being selected to represent desired regions of the parameter space;

determining whether the first intermediate model is sufficiently calibrated to the ground-truth model by comparing the results of the first intermediate model with the results of the ground-truth model, wherein sufficiently calibrated means that the first intermediate model can be used as a proxy for the ground-truth model to enable a development planning decision to be made;

when the first intermediate model is not sufficiently calibrated to the ground-truth model, generating a second intermediate model by identifying a second intermediate level of detail generally between the ground-truth level of detail for each modeling dimension and the first intermediate level of detail for each modeling dimension, running second intermediate model instances to generate results of the second intermediate model, determining whether the second intermediate model is sufficiently calibrated to the ground-truth model by comparing the results of the second intermediate model with the results of the ground-truth model;

when one of the first and second intermediate models is sufficiently calibrated to the ground-truth model, connecting one of the first and second intermediate models to the sufficiently-fine model;

outputting one or more model instances of the sufficiently-fine model, the first intermediate model instances, and the second intermediate model instances;

using the outputted model instances to predict at least one of a presence and a location of hydrocarbons in the subsurface region; and extracting hydrocarbons from the subsurface region based at least in part on the predicted presence, the predicted location, or both.

* * * * *